United States Patent [19]
Lee et al.

[11] Patent Number: 5,955,566
[45] Date of Patent: Sep. 21, 1999

[54] THERMOSETTABLE RESIN COMPOSITIONS WITH IMPROVED STORAGE STABILITY AND OXIDATIVE STABILITY

[75] Inventors: Jean Lee, Torrence; Jack Douglas Boyd, San Clemente; Albert Kuo, Cypress, all of Calif.

[73] Assignee: Cytec Technology Corporation, Wilmington, Del.

[21] Appl. No.: 08/748,456

[22] Filed: Nov. 13, 1996

Related U.S. Application Data

[60] Provisional application No. 60/006,447, Nov. 13, 1995.

[51] Int. Cl.⁶ .......................... C08G 73/12; C08F 22/40
[52] U.S. Cl. .......................... 528/310; 528/170; 528/173; 528/322; 528/332; 528/353; 525/422; 525/423; 525/537; 526/259; 526/262; 526/263
[58] Field of Search .................................. 528/310, 170, 528/173, 322, 353, 332; 525/422, 423, 537; 526/262, 259, 263

[56] References Cited

U.S. PATENT DOCUMENTS

| | | | |
|---|---|---|---|
| 3,536,734 | 10/1970 | Vegter et al. | 528/322 |
| 4,035,345 | 7/1977 | Ducloux et al. | 528/322 |
| 4,100,140 | 7/1978 | Zahir et al. | 526/90 |
| 4,175,175 | 11/1979 | Johnson et al. | 528/125 |
| 4,546,131 | 10/1985 | Hefner, Jr. | 523/466 |
| 4,564,683 | 1/1986 | Adams et al. | 526/262 |
| 4,568,733 | 2/1986 | Parker et al. | 526/262 |
| 4,654,407 | 3/1987 | Domeier | 526/262 |
| 4,689,378 | 8/1987 | Chaudhari et al. | 526/259 |
| 4,812,511 | 3/1989 | Domeier | 524/850 |
| 4,853,449 | 8/1989 | Domeier | 524/700 |
| 5,003,017 | 3/1991 | Eisenbarth et al. | 526/262 |
| 5,003,018 | 3/1991 | Repecka | 526/262 |
| 5,059,665 | 10/1991 | Eisenbarth et al. | 526/262 |
| 5,093,459 | 3/1992 | Peter et al. | 528/170 |
| 5,143,969 | 9/1992 | Reck et al. | 524/548 |

FOREIGN PATENT DOCUMENTS

| | | |
|---|---|---|
| 0230741 | 8/1987 | European Pat. Off. ........ C08L 79/08 |
| 0 296 112 A2 | 6/1988 | European Pat. Off. . |
| 5-155984 | 6/1993 | Japan . |

*Primary Examiner*—P. Hampton-Hightower
*Attorney, Agent, or Firm*—Kristin H. Neuman; Michael J. Kelly; Claire M. Schultz

[57] ABSTRACT

Thermosetting polymers with high temperature capability for composite and adhesive applications are disclosed. Inhibitors for improving pot life, gel time and storage stability are disclosed. These polymers are ideally suited for adhesives and RTM, resin film infusion, and prepreg methods to make polymer matrix, fiber reinforced composite parts.

13 Claims, No Drawings

THERMOSETTABLE RESIN COMPOSITIONS WITH IMPROVED STORAGE STABILITY AND OXIDATIVE STABILITY

This application claims priority under 35 U.S.C. § 119 from U.S. Provisional Application Ser. No. 60/006,447 (filed Nov. 13, 1995), which is incorporated by reference herein as if fully set forth.

TECHNICAL FIELD

This invention relates to the use of inhibitors for improving pot life, gel time and storage stability of bismaleimide resins. Such resins are suitable for resin transfer molding (RTM), adhesives, resin film infusion, and prepreg methods to make polymer matrix, and fiber reinforced composite parts for high temperature applications.

BACKGROUND OF THE INVENTION

In a mixture in which solid bismaleimide reactants and liquid co-reactants are mixed, one problem often encountered by the application of heat is the imposition of thermal history on the subject resin and increasing viscosity, which is usually undesirable for composite and adhesive applications. Thermal history refers to the heat that is applied during processing to make the resin mixture. The resin mixture is the form of the product that contains all the reactants before the hardening that forms the final product. The resin mixture can then be applied to fibers to become prepreg which is then molded to form the final part. The resin mixture can also be used as an adhesive as is, or the resin mixture can be used as is for resin transfer molding and resin film infusion composite applications.

The effect of thermal history is usually undesirable, but inevitable during melt processing. The subject resin mixture can be melt processed by two methods, a completely homogeneous resin system or slurry mixing. The preparation of homogeneous resin requires higher temperature than slurry mixing, and therefore, more thermal history in the mixing to dissolve all the bismaleimide powder.

Another undesirable problem of the prepregs or the bismaleimide resin mixture is its instability during storage. During storage the resin mixture can continue to chemically change which manifests itself in continually shortening gel time, continually reducing pot life and reduced prepreg and adhesive tack. This is especially undesirable because the processing conditions to make the final product from the resin mixture will require adjustment to account for the changed reactivity.

As a result, there is a need in this technical area to control the advancement and chemical reactivity of the resin mixture during manufacturing, storage, and final part processing such that the subject resin mixture can be inhibited from polymerization until the cure cycle.

SUMMARY OF THE INVENTION

It has been surprisingly discovered that prepregs, adhesives and resin mixtures can be effectively inhibited in manufacturing and storage for the prevention of premature polymerization. In addition, since the cure cycle of the resin mixture is usually fixed, an adequate gel time is crucial and the inhibitors lengthen the gel time. In another example the resin mixture may contain solid bismaleimide resin components. Melting and dissolving must precede polymerization in these resin mixtures. An adequate gel time will ensure the subject resin mixture will attain optimized cured properties in accordance with its designed stoichiometry.

Specifically, this invention is directed to a thermosettable, curable, resin composition that is useful for high temperature composite and adhesive applications, comprising one or more bismaleimide resins, a liquid olefinic co-reactant containing at least one aromatic ring, and inhibitors selected from the group consisting of free radical inhibitors.

This invention is further directed to a thermosettable, curable, resin composition comprising one or more bismaleimide resins, a liquid olefinic co-reactant containing at least one aromatic ring, and inhibitors selected from the group consisting of free radical inhibitors in which the composition after curing has a decreased weight loss upon thermal aging.

DESCRIPTION OF THE PREFERRED EMBODIMENTS

The process of the subject invention involves the combination of one or more solid bismaleimide monomers with the other resin system components. This invention is directed to the use of inhibitors as one such component.

In this application, "the solid bismaleimide monomers" may alternatively be described as a specific bismaleimide component, a solid reactant and/or solid aromatic diamine bismaleimide resin reactant.

The "liquid co-reactant" may be described to include a liquid olefinic species with at least one olefinic group and at least one aromatic ring.

The term "resin mixture" as used herein refers to a heat-curable resin composition in its final form. The composition may contain one or more reactive monomers and/or comonomers, inhibitors, curing agents, any necessary catalysts, and optionally filler, rheology control agents, tackifiers, tougheners, diluents, dyes, and pigments, but exclusive of fiber reinforcement.

The use of slurry mixing in the preparation of bismaleimide resin systems containing incompatible components is but one mode of practicing the subject invention. See U.S. Pat. No. 5,003,018. Slurry mixing is merely an aid in preparing the resin of the invention. Slurry mixing is important when large quantities of crystalline bismaleimides are contained in the resin formulation, as such formulations, when prepared by fully dissolving, are frequently very difficult to process. The slurry mixing process has been found to be useful whether or not the overall resin system components are compatible.

It should be noted that slurry mixing is not required for good resistance to oxidation. Good resistance to oxidation is a function of the monomers, not the process of preparation. However, for prepreg and adhesive applications the invention will most likely be practiced using slurry mixing.

The resin system, upon cooling, will generally not show the presence of large or substantial amounts of crystals. In some cases, the resin system may have the appearance of a solid solution or glass. Yet despite the uniform appearance, these uncured resin systems frequently possess virtually no tack, and often are highly brittle. Surprisingly, when the same components are slurry mixed, the resulting resin system has excellent tack and drape.

The term "decreased weight loss" as used herein relates to a comparison of the weight loss of cured composites after the composites have been heat treated. Thermal aging is used to determine the effect of the resin and the composite materials after dormant treatment with heat over a period of time in air. It is expected that a certain component of the resin and composite will be oxidized during the aging process. Correlation can be made in the stability of a particular composite structure by comparing the weight loss from the composite structure after thermall aging. Generally, thermal aging takes place over a period of time at a particular temperature. For purposes of this invention, the time for such aging may range from one day to several years. For test purposes, the time of thermal aging used was from three weeks to nine weeks. For purposes of this invention, the temperature in which the thermal aging was evaluated ranges from about 200° C. to 300° C., with a preferred temperature ranging from 220° C. to 280° C. These times and temperatures are used for an accelerated evaluation of composite.

The claimed heat-curable resin systems of the subject invention contain (excluding inorganic fillers, fibers and non-bismaleimide and co-reactant resin materials) from between about 20 to 90 percent by weight of one or more solid bismaleimide reactants. Preferably, the solid bismaleimide reactants are present from between about 40 to 80 percent by weight of the total resin composition. The claimed heat-curable system also contains from between about 10 to 80 percent by weight of one or more co-reactants (excluding inorganic fillers, fibers and bismaleimide and non co-reactant resin materials). Preferably, the liquid co-reactants are present from between about 20 to 60 percent by weight of the reactive components in the composition upon curing. The weight ratio of solid bismaleimide resin reactant to the liquid co-reactants ranges from about 80:20 to about 20:80. Also, the bismaleimide resin reactant and the olefinic co-reactant together comprise greater than 50 percent total weight of the reactive components in the composition. Preferably, the bismaleimide reactant and the liquid co-reactant have a high amount of aromatic groups. Bismaleimide of certain structures have unexpectedly been found to have significantly improved oxidative stability.

A number of suitable bismaleimide monomers exist. The common feature for this monomer is that it must be highly aromatic and preferably have more than one aromatic group. Groups connecting to the aromatic ring can be methylene, isopropylidene, oxygen, ketone sulfone or sulfide. Such bismaleimides when used in the invention have been found to have markedly improved oxidative stability as a result of thermal aging in air. Pendant aliphatic groups are detrimental, for example, methyl, ethyl, n-propyl, i-propyl and the like. However, the presence of methylene groups in the solid reactant tends to increase stability of the aromatic nucleus against oxidation. For the purpose of this invention, methylene dianiline bismaleimide (MDA-BMI) is preferred. Other preferred solid bismaleimide reactants of this invention include, but are not limited to, bis (aminophenoxyphenyl)propane bismaleimides (BAPP-BMI), oxydianiline bismaleimide (ODA-BMI), bis (aminophenoxy)benzene bismaleimides (APB-BMI), diaminodiphenylsulfone bismaleimides (DADS-BMI), diaminodiphenylisopropylidine bismaleimides, diaminodiphenylketone bismaleimides, diaminodiphenyl sulfide bismaleimides, diaminodiphenylhexafluoroisopropylidine bismaleimides, bis(diaminodiphenylisopropylidine)benzene bismaleimides, and the like. Certain eutectic mixtures of BMI monomers containing methylene dianiline bismaleimide (MDA-BMI), toluene dianiline bismaleimide (TDA-BMI) and trimethylenehexamethylenediamine bismaleimide, and the like can also be used in the formulation of the present invention.

Wholly aliphatic bismaleimides, for example, hexamethylenediamine-bismaleimides can be used in small amounts to increase tack as long as the thermal aging properties are still acceptable.

Bismaleimide monomers are well known to those skilled in the art, and are generally prepared by the reaction of maleic anhydride, or substituted maleic anhydride, with a suitable diamine. Both aromatic and aliphatic diamines are suitable for the preparation of the bismaleimide. Suitable diamines for the preparation of bismaleimides also include aromatic diamines such as phenylenediamine, diaminodiphenylsulfones, diaminodiphenylisopropylidenes, diaminodiphenylketones, diaminodiphenyloxides and diaminodiphenylsulfides and the like.

Bismaleimides derived from diamines containing heteroatoms and oligomers are also useful, for example those derived from amino terminated polyethersulfones, polyetherketones, polyetherketoneketones, polyetheretherketones and similar oligomers as prepared in accordance with U.S. Pat. No. 4,175,175, as well as amino terminated polyoxyalkylene polyethers, amino terminated N,N-dialkylpiperidines, and the like.

Also useful are polyaminobismaleimide prepolymers which may be prepared through the reaction of a stoichiometric excess of one or more bismaleimides with a di- or polyamine. Such polyaminobismaleimides or related products may also be prepared in situ by including in the resin system one of the aforementioned diamines, preferably one of the diaminodiphenylsulfones.

The resin system of the subject inventions may contain one or more comonomers. These comonomers may be comonomers which react with the bismaleimide monomers, or which react with themselves or with other comonomers or may be the same or a different bismaleimide resin. Other comonomers include, for example, those discussed in U.S. Pat. Nos. 4,100,140 and 4,035,345, which are incorporated herein by reference. Allylnadicimide resins, epoxy resins, di- and polyamines, cyanate resins, acrylics, unsaturated polyester resins, and alkenylphenol-terminated oligomeric tougheners similar to those disclosed in European published application 230,741 are useful. Silicone rubbers may also be utilized as comonomers, particularly those terminated with maleimide, epoxy, vinyl and amino groups.

In addition to such comonomers, the resin systems of the subject invention may also include engineering thermoplastic tougheners, particularly polyimides, polyetherimides, polyetherketones, polyarylenesulfides, polyarylenesulfones, polyethersulfones, and the like. Such thermoplastic tougheners should have glass transition temperatures, Tg, in excess of about 100° C.

Suitable epoxy comonomer resins are disclosed in the treatise Handbook of Epoxy Resins, McGraw-Hill, Inc., 1967. Examples of such resins are the bisglycidyl ethers of the bisphenols, particularly bisphenol A, bisphenol F and bisphenol S. Also suitable are the various phenolic and cresolic novolac-type resins, as well as the various glycidoxy amines and aminophenols, particularly N,N,N',N'-tetrakis(glycidyl)-4,4'-diaminodiphenylmethane and N,N,O-tris(glycidyl)-4-aminophenol. Epoxy resin based on the glycidyl ethers of the various dihydroxynaphthalenes and phenolated dicyclopentadienes are also suitable.

Cyanate functional comonomers are also useful. Such monomers are prepared by the reaction of cyanogen chloride or bromide with a diol or polyol. Examples of suitable diols include the bisphenols, the tetramethylbisphenols, other cyanates commercially available and in the literature, resorcinol, the hydroxyalkcyanurates and isocyanurates and the like. Such cyanate systems are well known to those skilled in the art, and are commercially available from a number of sources. Their preparation is also well known, and may be accomplished by the methods proposed in U.S. Pat. No. 4,546,131. Cyanate resins might need a catalyst.

The resin systems of this invention may also include other components, some of which may also affect the compatibility of the bismaleimide monomers. Catalysts are generally present, for example, in amounts of from 0.01 percent to about 5.0 percent by weight. Preferred catalysts include triphenylphosphine, the various tertiary amines, imidazoles, or diamines. The comonomers may require a catalyst for their polymerization when cured at lower temperatures. The system may also contain various dyes, pigments, fillers and rheology control agents. These additional components are well known to those skilled in the art.

Most of the resin mixtures described herein can be made by solution methods, and solution processing of these resin mixtures would not add thermal history to the resin mixtures. Also, this invention is also useful to stabilize the resin system as well during storage.

This invention offers an effective method for controlling gel time, pot life and storage stability of the bismaleimide resin for high temperature use. One or more free radical inhibitors are used in this invention. The term "free radical inhibitors" as used herein refers to compounds that retard or stop an undesired chemical reaction, such as oxidation or polymerization. Examples are substituted quinones, hindered phenols, phenothiazines, substituted catechols, copper naphthenate, zinc-dimethyldithiocarbamate. Preferably, free radical inhibitors in this invention are provided as 1 ppm to 5% w/w concentration of hydroquinone (HQ), 1 ppm to 5% w/w 1,4-naphthoquinone (NO), copper naphthenate (8% w/w Cu Nap All), and tert-butyl hydroqunone (MTBHQ) at 0.05% (w/w) or more.

The liquid co-reactant of this invention is an olefinic species containing at least one olefinic group and at least one aromatic ring. Generally, for high temperature use, it is preferred to have a high ratio of aromatic moieties to other groups. The liquid co-reactant can be monofunctional or bi-functional. Examples of preferable bi-functional liquid co-reactants include, but are not limited to 4,4'-bis[O-(1-propenyl)-phenoxy]benzophenone ("PPB") and 2,6-bis[O-(1-propenyl)phenoxy]pyridine ("PPP"). Monofunctional co-reactants having only one alkenyl group are also a part of the preferred embodiment. Such substances in general, have lower molecular weight compared to substances with two alkenyl groups, and hence, lower viscosity which will impart prepreg tack. The monofunctional co-reactants can also have a high ratio of aromatic to aliphatic groups, thus do not reduce oxidative stability. It is generally preferable to have primarily a bi-functional curing agent because monofunctional curing agents tend to reduce the bonding in the molecular network and can reduce Tg. An example of a monofunctional modifier is (3-allyl-2-hydroxylphenyl) benzene.

Other co-reactant are the alkenylphenols and alkenyloxyphenyls. Suitable are, for example, o,o'-diallyl- and o,o'-dipropenylbisphenols such as o,o'-diallyl- and o,o'-dipropenylbisphenol A, bisphenol F and/or bisphenol S. Also suitable are the alkenylphenol- and alkenyloxyphenyl terminated dicyclopentadienes. The latter are prepared by first forming the phenolated dicyclopentadiene precursor as taught in U.S. Pat. No. 3,536,734. The precursor is then reacted with the requisite alkenylhalide such as allyl chloride or propenyl chloride in the presence of base to form the allyl or propenyl ether. These ethers may be used as such or may be isomerized through Claisen rearrangement to the ortho substituted phenol. Various other comonomers are described in U.S. Pat. No. 5,003,018, which are incorporated herein by reference.

Prepregs were made from fibers at 145 g/m² AFW at 115° C. for 2.1 m/min. The cure cycle for all test panels was 45 min at 143° C. followed by 4 hours at 191° C. Post cure was performed for 6 hours at 227° C.

Gel time is a standard measure of resin reactivity and is well known to those skilled in the art. The time required to gel up the liquid resin is defined a gel-time. The measurement takes place at the temperatures and for the times that mimic the conditions of actual use. The gel-time is measured in a test tube containing 10 grams of the subject bismaleimide resin by a stirring rod at 149° C. and 163° C. An oil bath is prepared at the temperature of the gel test. The test tube is immersed in the bath and the resin is probed with a glass rod. The gel time is taken at the point where the resin has become a solid mass, and no longer flows. Generally, for resin transfer molding applications, the longer the gel time or the longer the pot life, the better the system is for the application.

The mechanical characteristics of the resins with inhibitors are measured by Compression After Impact (CAI) and Open Hole Compression (OHC) tests of the panels. These tests are widely used in the industry and are well known to those skilled in the art. The specific test method used herein is BMS 8-276C, a widely used Boeing Airplane Company specification. Tg, the glass transition temperature, relates to the softening point of the cured resin, and demonstrate whether there is a change in the degree of cure of the resins as they are associated with inhibitors.

The following specific examples are intended to illustrate certain aspects of the present invention; they are not to be construed as limitations thereof.

EXAMPLES 1 AND 3

0.1 part (w/w) of hydroquinone was added to 99.9 parts of preheated PPB (w/w) at 121° C. until all the hydroquinone had completely dissolved. This pre-inhibited resin was then cooled to 70 to 95° C. for the addition of 100 parts (w/w) of the ground MDA-BMI below 50 μm. This slurry mixture was stirred until homogeneous, and weigh out a small quantity for gel test. Such resin at 70 to 95° C. was then metered onto silicone release paper, and impregnated into 12K intermediate modulus type carbon fibers at a nominal resin content of 35%, and 145 g/m². Prepreg tape was then cut and layed up into a quasiisotropic panel for CAI and OHC testings in accordance with Boeing Material Specification 8-276C. The test specimens for Tg measurement, using a DuPont 983 dynamic mechanical analyzer, were cut from panels of 12 plies stacked tape with the same fiber orientation. The cure cycle for all test panels was 45 min. at 143° C., followed by 4 hours at 191° C., and post cured for 6 hours at 227° C., all under 85 psi. The result of gel time, CAI, OHO, and Tg are provided in Tables 1 and 2.

EXAMPLE 2 (NON-INHIBITED)

This non-inhibited resin employed the same base resin system as Example 1, with the exception that no inhibitor was added. The gel time continued to decrease during storage as shown in Table 1.

EXAMPLES 4 TO 6

The same resin system as Example 1 was used, with the only substitution of inhibitors being added in the same fashion in the same amount. The gel times were lengthened with the addition of Cu Nap-All, and NQ as shown in Table 2. Gel time test were conducted side-by-side at 163° C. NQ and Cu Nap-All were effective inhibiting advancement as demonstrated by the gel time data without causing significant changes in the mechanical characteristics.

TABLE 1

| Example* | 1 (HQ) | 2 (Non-inhibited) |
|---|---|---|
| Day 0 | 25 min. | 25 min. |
| Day 12 | 31 min. | 23 min. |
| Day 47 | 30 min. | 8 min. |

*Days at room temperature in an open container

The comparison of gel time during room temperature storage in HQ-inhibited and non- inhibited systems demonstrates that the inhibitor stabilizes the resin. Gel time test was conducted side-by-side at 149° C. The dosage of HO was 0.05% for the inhibited system.

TABLE 2

| Example | 3 (HQ) | 4 (Cu Nap-All) | 5 (NQ) | 6 (MTBHQ) |
|---|---|---|---|---|
| Day 0 | 21 min. | 31 min. | 35 min. | 23 min. |
| Day 20 | 21 min. | 29 min. | 31 min. | 17 min. |
| Day 35 | 15 min. | *32 min. | 18 min. | 30 min. |
| CAl, MPa | 196.6 | 193.8 | 199.3 | 193.1 |
| OHC, MPa (82° C.) | 182.8 | 186.9 | 177.2 | 181.4 |
| Tg, ° C. (Storage) | 275 | 277 | 278 | 278 |

The comparison of inhibitors is provided. NQ and Cu Nap-All were most effective in inhibiting advancement/chemical changes without significant changes to the mechanical characteristics. The gel time measurements were conducted at 163° C. with an inhibitor concentration of 0.05% (w/w).

It will be appreciated that variations and modifications to the products and methods can be made by the skilled person without departing from the spirit or scope of the invention as defined in the appended claims.

What is claimed is:

1. A thermosettable resin composition comprising:
   A. a bismaleimide monomer;
   B. a liquid co-reactant having at least one olefinic group and at least one aromatic ring; and
   C. a free radical inhibitor;
   wherein the composition before curing has improved room temperature storage stability, as characterized by gel time measured in minutes at 149° C. upon preparation, and at 47 days post-preparation; wherein the gel time at 47 days post-preparation is greater than the gel time measured upon preparation.

2. The thermosettable resin composition of claim 1, wherein the free radical inhibitor is hydroquinone.

3. The thermosettable resin composition of claim 2, wherein the bismaleimide monomer is methylene dianiline bismaleimide, and the liquid co-reactant is 4,4'-bis[O-(1-propenyl)-phenoxy]benzophenone.

4. A thermosettable resin composition comprising:
   A. a bismaleimide monomer;
   B. a liquid co-reactant having at least one olefinic group and at least one aromatic ring; and
   C. a free radical inhibitor;
   wherein the composition before curing has improved room temperature storage stability, as characterized by gel time measured in minutes at 163° C. upon preparation and at 35 days post-preparation; wherein the gel time at 35 days post-preparation is greater than, equal to, or no more than about 6 minutes less than the gel time measured upon preparation.

5. The composition of claim 4, wherein the inhibitor is selected from the group consisting of hydroquinone, 1,4-naphthoquinone, copper naphthenate, and tert-butyl hydroquinone.

6. The composition of claim 5, wherein the inhibitor is 1,4-naphthoquinone.

7. The composition of claim 6, wherein the bismaleimide monomer is methylene dianiline bismaleimide, and said liquid co-reactant is 4,4'-bis[O-(1-propenyl)-phenoxy] benzophenone.

8. The composition of claim 4, wherein the gel time at 35 days post-preparation is greater than, equal to, or no more than about 3 minutes less than the gel time measured upon preparation.

9. A prepreg comprised of fibrous material and the thermosettable resin composition of either claim 1 or 4.

10. An adhesive comprised of the thermosettable resin composition of either claim 1 or 4.

11. A resin for resin transfer molding or resin film infusion, comprised of the thermosettable resin composition of either claim 1 or 4.

12. A composite part comprised of the thermosettable resin composition of either claim 1 or 4.

13. An adhesive bonded structure comprised of the thermosettable resin composition of either claim 1 or 4.

* * * * *